(12) United States Patent
Chang et al.

(10) Patent No.: US 8,709,650 B2
(45) Date of Patent: Apr. 29, 2014

(54) CATHODE ACTIVE MATERIAL AND LITHIUM SECONDARY BATTERY COMPRISING THE SAME

(75) Inventors: Sung kyun Chang, Daejeon (KR); Hong-Kyu Park, Daejeon (KR); Sunkyu Kim, Seongnam-si (KR); Sinyoung Park, Daejeon (KR); Young Hwa Jung, Daejeon (KR); Geun-Chang Chung, Daejeon (KR); Keun Wan An, Daejeon (KR); Soo Min Park, Daejeon (KR); Ji Eun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/450,947

(22) Filed: Apr. 19, 2012

(65) Prior Publication Data

US 2013/0065118 A1  Mar. 14, 2013

Related U.S. Application Data

(63) Continuation of application No. PCT/KR2011/002211, filed on Mar. 31, 2011.

(30) Foreign Application Priority Data

Apr. 1, 2010  (KR) .......................... 10-2010-0029718

(51) Int. Cl.
*H01M 4/02* (2006.01)
*H01M 4/13* (2010.01)

(52) U.S. Cl.
USPC .......................................... 429/211; 429/209

(58) Field of Classification Search
None
See application file for complete search history.

(56) References Cited

U.S. PATENT DOCUMENTS

| | | | |
|---|---|---|---|
| 5,264,201 A * | 11/1993 | Dahn et al. ................ | 252/519.1 |
| 2004/0197654 A1 | 10/2004 | Barker et al. | |
| 2005/0069771 A1 | 3/2005 | Manev et al. | |
| 2005/0112054 A1 | 5/2005 | Eberman et al. | |
| 2006/0194112 A1* | 8/2006 | Barker et al. .............. | 429/231.9 |
| 2007/0202407 A1* | 8/2007 | Eberman et al. ........... | 429/231.3 |
| 2008/0280203 A1 | 11/2008 | Yada et al. | |
| 2008/0311432 A1 | 12/2008 | Park et al. | |
| 2008/0314482 A1* | 12/2008 | Suzuki et al. ............... | 148/559 |
| 2009/0075165 A1 | 3/2009 | Park et al. | |
| 2009/0325072 A1 | 12/2009 | Maeda et al. | |

FOREIGN PATENT DOCUMENTS

| | | |
|---|---|---|
| EP | 2 398 096 A2 | 12/2011 |
| EP | 2 506 342 A2 | 10/2012 |
| EP | 2 506 343 A2 | 10/2012 |
| JP | 2002-80448 A | 3/2002 |
| JP | 2002-110253 A | 4/2002 |
| JP | 2004-134245 A | 4/2004 |
| KR | 10-2005-0111631 A | 11/2005 |
| KR | 10-0570417 B1 | 4/2006 |
| KR | 10-2006-0097734 A | 9/2006 |
| KR | 10-2008-0109298 A | 12/2008 |
| KR | 10-2009-0030087 A | 3/2009 |
| KR | 10-2010-0002107 A | 1/2010 |
| WO | WO 2006/091019 A1 | 8/2006 |

OTHER PUBLICATIONS

Amine et al., Advanced cathode materials for high-power applications, Journal of Power Sources 146 (2005) 111-115.*
Fergus, Recent developments in cathode materials for lithium ion batteries, Journal of Power Sources 195 (2010) 939-954, Available online Sep. 6, 2009.*
International Search Report issued in PCT/KR2011/002211, dated Jan. 2, 2012.

* cited by examiner

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

Disclosed herein is a cathode active material for a secondary battery, which includes a combination of one or more selected from compounds represented by Formula 1, one or more selected from compounds represented by Formula 2, and one or more selected from compounds represented by Formula 3, $$(1-s-t)[Li(Li_aMn_{(1-a-x-y)}Ni_xCo_y)O_2]*s[Li_2CO_3]*t[LiOH] \quad (1)$$

$$Li(Li_bMn_{(2-b)})O_4 \quad (2)$$

$$(1-u)LiFePO_4*uC \quad (3)$$

In these formulae 0<a<0.3; 0<x<0.8; 0>y>0.6; 0<s<0.05; 0<t<0.05; 0<b<0.3; 0.01<u<0.1, wherein a, b, x and y denote mole ratios; and s, t and u denote weight ratios. The disclosed cathode active material has long lifespan and storage characteristics at room temperature and/or high temperature and excellent safety, and is effectively used to fabricate a non-aqueous electrolyte type high power lithium secondary battery having excellent rate properties and power characteristics.

9 Claims, No Drawings

CATHODE ACTIVE MATERIAL AND LITHIUM SECONDARY BATTERY COMPRISING THE SAME

CROSS REFERENCE TO RELATED APPLICATIONS

This application is a Continuation of PCT International Application No. PCT/KR2011/002211 filed on Mar. 31, 2011, which claims priority under 35 U.S.C. §119(a) to Patent Application No. 10-2010-0029718 filed in the Republic of Korea on Apr. 1, 2010, all of which are hereby expressly incorporated by reference into the present application.

TECHNICAL FIELD

The present invention relates to a cathode active material including a combination of specific three different compounds, with various advantages such as long lifespan and storage characteristics at room temperature and/or high temperature, and excellent safety, rate properties and power characteristics.

BACKGROUND ART

Technological development and increased demand for mobile equipment have led to a rapid increase in the demand for secondary batteries. Among these secondary batteries, lithium secondary batteries having high energy density and output voltage, long cycle life and low self-discharge ratio are commercially available and widely used.

Recently, increased concern over environmental issues has brought about a great deal of research associated with electric vehicles (EV) and hybrid electric vehicles (HEV) as substitutes for vehicles using fossil fuels, such as gasoline vehicles and diesel vehicles, which are a major cause of air pollution. Although nickel metal hydride (Ni-MH) secondary batteries have mostly been used as a power source of such EV and/or HEV, a great deal of studies into use of lithium secondary batteries having high energy density and high discharge voltage are underway and some of these are commercially available.

Specifically, the lithium secondary battery used for EV must have high energy density and high output power in a short time and, in addition, be used even under severe ambient conditions for at least 10 years. Therefore, it is necessary for the above secondary battery to have excellent safety and long lifespan, as compared to existing small lithium secondary batteries.

A lithium ion secondary battery used as conventional small battery includes a lithium-cobalt composite oxide having a layered structure in a cathode and a graphite material in an anode. However, for such lithium-cobalt composite oxide, although cobalt is widely used as a main component, this material encounters disadvantages including, for example, high cost due to scarcity of cobalt, low safety, etc., thus having limitations in use as a power source in EV applications, and the like. As a cathode used in a lithium ion battery for EV, a spinel structure lithium manganese composite oxide comprising manganese, which is relatively cheap and has excellent safety, may be suitably used.

However, for lithium manganese composite oxides, manganese is dissolved in an electrolyte when the electrolyte is stored at a high temperature, in turn deteriorating characteristics of the battery. Therefore, improved techniques to prevent such deterioration in battery characteristics are required. In addition, compared to typical lithium cobalt composite oxides or lithium nickel composite oxides, the lithium manganese composite oxide has low capacity per unit mass, in turn causing limitation in capacity increase per unit mass of battery. Therefore, there is also a requirement for development and/or design of a novel battery to solve the foregoing problems, ultimately enabling utilization thereof as a power source for EV.

In order to overcome various weaknesses described above, a great deal of studies into fabrication of electrodes using mixed cathode active materials have recently been conducted. For instance, Japanese Laid-Open Patent Publications Nos. 2002-110253 and 2004-134245 disclose techniques for using mixtures of lithium manganese composite oxides and lithium nickel cobalt manganese composite oxides in order to increase regenerative output or the like. However, the lithium manganese oxide still entails some disadvantages such as poor cycle life and limitations in improving safety.

Meanwhile, in order to increase capacity and lifespan and/ or improve high rate discharge characteristics of a battery, Korean Patent No. 0570417 discloses use of a spinel lithium manganese oxide ($LiMn_2O_4$) as a cathode active material; Japanese Laid-Open Patent Publication No. 2002-0080448 discloses use of a cathode active material containing lithium manganese composite oxide; and Japanese Laid-Open Patent Publication No. 2004-134245 discloses use of a cathode active material including a spinel lithium manganese composite oxide as well as a lithium transition metal composite oxide and, in addition, secondary batteries have been fabricated using the foregoing cathode active materials, respectively.

Secondary batteries used for EVs, HEVs, etc. generally require excellent rate properties and power characteristics depending upon vehicle operating conditions.

However, conventional technologies in the prior art have not yet proposed specific configurations of secondary batteries having sufficient lifespan and safety.

DISCLOSURE

Technical Problem

Accordingly, the present invention has been made to solve the above and other technical problems that have yet to be resolved.

As a result of a variety of extensive and intensive studies and experiments to solve the problems as described above, the inventors of the present invention have developed a cathode active material for a secondary battery including a combination of three different compounds represented by Formulae 1, 2 and 3, respectively, and found that, when a secondary battery is fabricated using such cathode active material, safety and lifespan of the battery may be suitably improved and the battery may also have excellent rate properties and power characteristics. The present invention was completed based on this discovery.

Technical Solution

Therefore, in an aspect of the present invention, there is provided a cathode active material for a secondary battery including a combination of one or more selected from compounds represented by Formula 1, one or more selected from compounds represented by Formula 2, and one or more selected from compounds represented by Formula 3, as illustrated below:

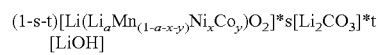

(1)

$$Li(Li_bMn_{(2-b)})O_4 \quad (2)$$

$$(1-u)LiFePO_4 \cdot uC \quad (3)$$

In the above Formulae,

0<a<0.3; 0<x<0.8; 0<y<0.6; 0<s<0.05; 0<t<0.05; 0<b<0.3; and 0.01<u<0.1, wherein a, b, x and y denote mole ratios, and s, t and u denote weight ratios.

As described in the foregoing, the present invention provides a cathode active material prepared by mixing a lithium nickel-manganese-cobalt composite oxide, which has a layered structure and comprises respective elements and compounds in specific content ratios, a spinel lithium manganese oxide, and a lithium iron phosphate having an olivine structure, as well as use thereof.

With regard to the compound represented by Formula 1, specific content ratios of elements thereof and behaviors of lithium carbonate ($Li_2CO_3$) and lithium hydroxide (LiOH) may not be concretely stipulated. However, it is presumed that, when the compound represented by Formula 1 is combined with the compound represented by Formula 2 and the compound represented by Formula 3 and used, weaknesses of respective compounds may be suitably overcome while maximizing merits thereof This will be described in more detail as follows.

The compound represented by Formula 2 and the compound represented by Formula 3 have advantages such as excellent thermal stability and low cost. However, the compound represented by Formula 2 and the compound represented by Formula 3 entail problems such as low capacity and poor characteristics at high temperature. Specifically, the compound represented by Formula 2 has a defect of easy Mn dissolution due to structural problems such as Jahn-Teller distortion and such Mn dissolution may be exacerbated by HF present in a battery.

On the other hand, the compound having basic properties and favorable structural stability represented by Formula 1, which is used for the cathode active material according to the present invention, may control (or prevent) reaction of the compound represented by Formula 2 and/or the compound represented by Formula 3, which have high safety but exhibit structural instability during storage at high temperature, with a strong acid, that is, HF present in a battery. In addition, the foregoing compound represented by Formula 1 may attract HF, to thereby minimize an amount of Mn dissolution from the compound represented by Formula 2 and inhibit deterioration of the compound represented by Formula 3. For this reason, the compound represented by Formula 3 may embody original characteristics such as stability.

Predetermined amounts of lithium carbonate ($Li_2CO_3$) and lithium hydroxide (LiOH) may be contained in the compound represented by Formula 1. More particularly, a total content of $Li_2CO_3$ and LiOH may be less than 0.05 wt. parts, preferably, less than 0.03 wt. parts, relative to a total weight of the compound represented by Formula 1. If the total content of $Li_2CO_3$ and LiOH exceeds 0.05 wt. parts, decrease in battery capacity and/or negative reaction may be caused, thus not being preferable.

The compound represented by Formula 1 may be contained in an amount of 10 to 90 wt. %, relative to a total weight of the cathode active material. If a content of the compound represented by Formula 1 is too low, desired capacity may not be obtained. On the other hand, when a content of the compound represented by Formula 1 is too high, battery safety may be deteriorated. For such reasons, the content of the compound represented by Formula 1 may range from 50 to 90 wt. %, relative to a total weight of the cathode active material.

In another aspect of the present invention, the compound represented by Formula 2 may be contained in an amount of 5 to 80 wt. %, relative to a total weight of the cathode active material. Alternatively, the compound represented by Formula 3 may be contained in an amount of 10 to 75 wt. %, relative to a total weight of the cathode active material. If a content of the compound represented by Formula 2 is too low, improvement in battery safety cannot be attained. On the other hand, when the content of the compound represented by Formula 2 is too high, battery capacity may be decreased, thus not being preferable. Likewise, if a content of the compound represented by Formula 3 is too low, improvement in stability cannot be obtained. On the other hand, when the content of the compound represented by Formula 3 is too high, difficulties in processing may be caused and energy density may be reduced, thus not being preferable. For such reasons, preferred contents of the compounds represented by Formula 2 and Formula 3 may range from 5 to 50 wt. % and 10 to 30 wt. %, respectively, relative to a total weight of the cathode active material.

As described above, if the contents of the compounds represented by Formula 2 and Formula 3 are too low, battery safety may be deteriorated. On the contrary, when the contents of both the above compounds are too high, desired lifespan may not be attained, thus not being preferable.

Mn in the compound represented by Formula 2 may be substituted by any other element which is able to locate at octahedral sites, for example, Al, Mg, etc. A substitution amount of each substitute element may be 0.2 mole ratio or less, relative to a total amount of transition metals. If the substitution amount is too large, desired capacity cannot be attained.

Alternatively, among the compound represented by Formula 2, oxygen ions may be substituted in a predetermined amount by other anions. Such substitute anions may be one or two or more selected from a group consisting of F, Cl, Br, I, S, chalcogenide compounds and nitrogen.

Because of substitution by the foregoing anions, bonding to transition metals may be improved and structural transition of the cathode active material may be successfully prevented, thereby increasing battery lifespan. However, if the substitution amount of anions is too large (more than 0.5 mole ratio relative to total moles of anions), the compound represented by Formula 2 may not maintain a stable spinel structure, in turn deteriorating lifespan and thus not being preferable. Therefore, the substitution amount of anions may range from 0.01 to 0.5 mole ratios, preferably, 0.01 to 0.2 mole ratios, relative to total moles of anions. Total anions mean overall anions including oxygen ions and substitute anions.

With regard to an olivine type lithium iron phosphate represented by Formula 3, olivine type lithium iron phosphate has very low conductivity and, therefore, the compound containing carbon with high conductivity in the form represented by Formula 3 is preferably used. The carbon in the above compound is more preferably contained as being coated on the surface of the olivine type lithium iron phosphate.

According to a preferred embodiment of the present invention, a stable material for a tetrahedral structure may dope phosphorous (P) sites in the compound represented by Formula 3. Such stable material for a tetrahedral structure may be one or two or more selected from a group consisting of Si, V and Ti. A preferred doping amount may range from 0.01 to 0.4 mole ratios, more preferably, 0.01 to 0.1 mole ratios.

Similar to the compound represented by Formula 2, oxygen ions in the compound represented by Formula 3 may also be substituted in a predetermined amount by other anions. In this case, the substitute anions may be one or two or more selected from a group consisting of F, Cl, Br, I, S, chalcogenide compounds and nitrogen. A preferred substitution amount may range from 0.01 to 0.4 moles, more preferably, 0.01 to 0.1 moles, relative to total moles of anions.

Since the compound represented by Formula 1, the compound represented by Formula 2 and the compound represented by Formula 3 according to the present invention can be prepared on the basis of the foregoing composition formulae, detailed description thereof will be omitted herein.

The present invention also provides a cathode mix containing the cathode active material described above, a conductive material and a binder.

The cathode mix may be formed into a slurry using a suitable solvent including, for example, water, NMP, etc. After applying the prepared slurry to a cathode current collector, the coated collector may be dried and rolled to produce a cathode.

In addition, the present invention provides a cathode for a secondary battery, which includes the cathode mix prepared as described above.

The cathode may be formed by, for example, mixing the cathode active material of the present invention, a conductive material and a binder to prepare a slurry, applying the slurry to a cathode current collector, and drying the coated collector. Optionally, at least one selected from a group consisting of a viscosity modifier and a filler may be added to the mixture (that is, the cathode mix) including the cathode active material, the conductive material and the binder.

The cathode current collector described above is generally fabricated to have a thickness in the range of 3 to 500 µm. Such cathode current collector is not particularly restricted so long as it has high conductivity without causing chemical modification of a battery. For example, the cathode current collector may be fabricated using stainless steel, aluminum, nickel, titanium, calcined carbon, or stainless steel or aluminum surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The conductive material is generally used to enhance conductivity of an electrode active material and may be added in an amount of 0.01 to 30 wt. % relative to a total weight of an electrode mix. Such conductive material is not particularly restricted so long as it has conductive properties without causing chemical modification of a battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder assists in combination of an active material with a conductive material and bonding to a current collector and is normally added in an amount of 1 to 50 wt. %, relative to a total weight of a mixture containing the cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

A viscosity modifier serves to control viscosity of an electrode mix in order to facilitate mixing of electrode materials and application thereof to a current collector, and may be added in an amount of 30 wt. % or less, relative to a total weight of the electrode mix. Examples of the viscosity modifier may include, but are not limited to, carboxymethyl cellulose, polyvinylidene fluoride, etc. Optionally, a solvent may also serve as the viscosity modifier.

The filler is a supplementary ingredient to inhibit electrode expansion, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

The present invention also provides a lithium secondary battery including the cathode described above, an anode, a separator and a non-aqueous electrolyte containing lithium salts.

The anode used herein is fabricated by, for example, applying an anode mix containing an anode active material to an anode current collector then drying the coated collector. In this case, the anode mix may optionally include the foregoing components.

The anode current collector is generally fabricated to have a thickness in the range of 3 to 500 µm. Such anode current collector is not particularly restricted so long as it has favorable conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

Examples of the anode active material may include: carbon and graphite materials such as natural graphite, artificial graphite, expanded graphite, carbon fiber, non-graphitizing carbon (often referred to as 'hard carbon'), carbon black, carbon nanotubes, Fullerene, activated carbon, etc.; metals alloyable with lithium, such as Al, Si, Sn, Ag, Bi, Mg, Zn, In, Ge, Pb, Pd, Pt, Ti, etc., as well as compounds containing the same; combination of carbon and graphite materials with metals and compounds thereof; lithium containing nitrides, and so forth. Among these, carbon active materials, silicon active materials, tin active materials or silicon-carbon active materials are preferably used and these materials may be used alone or in combination of two or more thereof.

The separator used herein is interposed between the cathode and the anode and may be formed using a thin insulation film having a high ion permeability and excellent mechanical strength. The separator typically has a pore diameter of 0.01 to 10 µm and a thickness of 5 to 300 µm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

The non-aqueous electrolyte containing lithium salt used herein comprises a lithium salt as well as a non-aqueous electrolyte. The non-aqueous electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate; or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$, etc.

The lithium salt used herein is a material readily dissolved in the non-aqueous electrolyte and may include, for example, LiCl, LiBr, LiI, $LiClO_4$, $LiBF_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The secondary battery fabricated according to the present invention may be employed as a unit cell of a battery module, which is a power source for medium and/or large-scale devices requiring high temperature safety, long cycle life properties, high rate properties, or the like.

Preferred examples of middle and/or large-scale devices described herein may include; electric vehicles, hybrid electric vehicles, plug-in hybrid electric vehicles, power storage systems, and so forth, without being particularly limited thereto.

BEST MODE

The present invention will be described in more detail with reference to the following Examples. These examples are provided only to illustrate the present invention and should not be construed as limiting the scope and spirit of the present invention.

EXAMPLE 1

An active material including; $0.9967Li(Li_{0.1}(Ni_{0.5}Mn_{0.4}Co_{0.1})_{0.9})O_2*0.0021LiOH*0.0012Li_2CO_3$, 0.98 $(LiFePO_4)*0.02C$ and $Li(Li_{0.1}Mn_{1.8}Al_{0.1})O_{0.4}$ in a relative ratio (by weight) of $(70:30)*0.9:10$, as well as a conductive material and a binder were mixed together in a ratio of 90:6:4 (that is, active material:conductive material:binder, ratio by weight). Next, the mixture was applied to Al-foil such that a loading amount in a final electrode reached about 1.6 mAh/$cm^2$. Carbon was used as an anode and an electrolyte used herein was prepared by dissolving $LiPF_6$ in EC:EMC=1:2 to reach 1M concentration. Using these materials, a pouch type mono-cell was fabricated.

EXAMPLE 2

A pouch type mono-cell was fabricated by the same procedures as described in Example 1, except that a ratio (by weight) of the active material was $(70:30)*0.95:5$.

COMPARATIVE EXAMPLE 1

A pouch type mono-cell was fabricated by the same procedures as described in Example 1, except that an active material including, $0.9967Li(Li_{0.1}(Ni_{0.5}Mn_{0.4}Co_{0.1})_{0.9})O_2*0.0021LiOH*0.0012Li_2CO_3$ and 0.98 $(LiFePO_4)$ in a relative ratio (by weight) of (70:30) was used.

EXPERIMENTAL EXAMPLE 1

Each of the batteries fabricated in Examples 1 and 2 and Comparative Example 1 was subjected to discharging at 120 mA for 10 seconds under state of charge (SOC) of 25%, 50% and 75%, respectively, so as to measure discharge resistance and discharge power. Results thereof are shown in TABLE 1.

TABLE 1

| | Discharge resistance (mΩ) | | | Discharge power (W) | | |
|---|---|---|---|---|---|---|
| | SOC 25% | SOC 50% | SOC 75% | SOC 25% | SOC 50% | SOC 75% |
| Example 1 | 3.17 | 3.44 | 3.37 | 0.79 | 0.85 | 1.02 |
| Example 2 | 3.29 | 3.57 | 3.40 | 0.76 | 0.81 | 0.98 |
| Comparative Example 1 | 3.58 | 3.83 | 3.79 | 0.70 | 0.72 | 0.88 |

For an electrode comprising a mixture of a layered structural material and an olivine structural material, safety and/or lifespan may be enhanced. However, the olivine structural material having very high electric resistance entails difficulties in using the same in typical batteries. When a conductive material is added to solve the above problem, capacity may be decreased.

On the other hand, it can be seen from results of Examples 1 and 2 in TABLE 1 that, when three different compounds described above are simultaneously used, specific characteristics including stability, safety, etc. may be maximized while attaining a desirable level of discharge powder. Although valid reasons are not clearly known, it is presumed that a manganese spinel material having high density and/or electrical conductivity may influence the foregoing characteristics. Specifically, since the layered structural active material according to the present invention includes LiOH and $Li_2CO_3$ simultaneously, Mn dissolution through reaction with HF, which is known to occur in the manganese spinel material, may be decreased.

Those skilled in the art will appreciate that various modifications and alterations may be possible, based on the foregoing description, without departing from the scope and spirit of the invention as defined in the appended claims.

INDUSTRIAL APPLICABILITY

As apparent from the foregoing description, a non-electrolyte secondary battery fabricated using a mixture, which includes a specific lithium nickel-manganese-cobalt composite oxide, a lithium manganese oxide and a specific lithium iron phosphate as a cathode active material according to the present invention, may ensure safety, increase lifespan at high temperature, and attain excellent rate properties and power characteristics.

The invention claimed is:

1. A cathode active material for a secondary battery, comprising a combination of:

one or more compound selected from compounds represented by Formula 1;

one or more compound selected from compounds represented by Formula 2; and one or more compound selected from compounds represented by Formula 3, $$(1-s-t)[Li(Li_aMn_{(1-a-x-y)}Ni_xCo_y)O_2]*s[Li_2CO_3]*t[LiOH] \quad (1)$$

$$Li(Li_bMn_{(2-b)})O_4 \quad (2)$$

$$(1-u)LiFePO_4*uC \quad (3)$$

wherein $0<a<0.3$; $0<x<0.8$; $0<y<0.6$; $0<s<0.05$; $0<t<0.05$; $0<b<0.3$; $0.01<u<0.1$; a, b, x and y denote mole ratios; and s, t and u denote weight ratios and wherein the compound represented by Formula 1 is contained in an amount of 20 to 90 wt. %, the compound represented by Formula 2 is contained in an amount of 5 to 80 wt. %, and the compound represented by Formula 3 is contained in an amount of 10 to 75 wt. %, relative to a total weight of the cathode active material.

2. A cathode mix containing the cathode active material as set forth in claim 1.

3. A cathode for a secondary battery formed by applying the cathode mix according to claim 2 to a current collector.

4. A lithium secondary battery including the cathode for a secondary battery according to claim 3.

5. The lithium secondary battery according to claim 4, wherein the battery is suitable for use as a unit cell for a battery module which is a power source for a medium or large-scale device.

6. The lithium secondary battery according to claim 5, wherein the medium or large-scale device is an electric vehicle, a hybrid electric vehicle or a plug-in hybrid electric vehicle.

7. The cathode mix active material according to claim 1, wherein a total content of $Li_2CO_3$ and LiOH in the compound of Formula 1 is greater than zero but less than 0.05 wt parts relative to a total weight of the compound represented by Formula 1.

8. The cathode mix active material according to claim 1, wherein a total content of $Li_2CO_3$ and LiOH in the compound of Formula 1 is greater than zero but less than 0.03 wt parts relative to a total weight of the compound represented by Formula 1.

9. The cathode mix active material according to claim 1, wherein the carbon in the compound of Formula 3 is coated on a surface of the $LiFePO_4$, which is an olivine type $LiFePO_4$.

* * * * *